United States Patent
Wada et al.

(10) Patent No.: US 7,297,928 B2
(45) Date of Patent: Nov. 20, 2007

(54) INDICATING INSTRUMENT FOR VEHICLE

(75) Inventors: Toshiki Wada, Kariya (JP); Kazumasa Kurokawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/377,218

(22) Filed: Mar. 17, 2006

(65) Prior Publication Data

US 2006/0208168 A1 Sep. 21, 2006

(30) Foreign Application Priority Data

Mar. 18, 2005 (JP) .............................. 2005-080004

(51) Int. Cl.
  *H01J 40/14* (2006.01)
  *G09F 13/12* (2006.01)
  *B60Q 1/26* (2006.01)

(52) U.S. Cl. ............ 250/216; 340/815.55; 340/815.57; 362/489

(58) Field of Classification Search ................ 250/216, 250/226; 340/461, 815.4, 815.55–815.57; 362/23, 29, 489
  See application file for complete search history.

(56) References Cited

U.S. PATENT DOCUMENTS 6,750,779 B2  6/2004  Wada et al.
6,886,970 B2  5/2005  Wada et al.
2003/0043049 A1*  3/2003  Wada et al. ............. 340/815.4

FOREIGN PATENT DOCUMENTS

JP  2-234857  9/1990
JP  2848512  11/1998

* cited by examiner

*Primary Examiner*—Kevin Pyo
(74) *Attorney, Agent, or Firm*—Nixon & Vanderhye P.C.

(57) ABSTRACT

An indicating instrument for a vehicle has a display board, a light modulation member disposed to cover a surface of the display board. An illumination intensity of the display board is detected by a light detecting member and a control unit applies to a dc pulse voltage to the light modulation member, to thereby control a light transmissivity of the light modulation member according to the illumination intensity. When the illumination intensity is higher than a predetermined level, the voltage is applied in one direction so that the light modulation member changes from a colorless condition to a colored condition to restrict an external light from reflecting on the display board. When the illumination intensity is lower than a predetermined level, the voltage is applied in a reverse direction so that the light modulation member is transferred from the colored condition to the colorless condition to maintain the visibility of the display board.

16 Claims, 5 Drawing Sheets

INDICATING INSTRUMENT FOR VEHICLE

CROSS REFERENCE TO RELATED APPLICATION

This application is based on Japanese Patent Application No. 2005-80004 filed on Mar. 18, 2005, the disclosure of which is incorporated herein by reference.

FIELD OF THE INVENTION

The present invention relates to an indicating instrument for a vehicle, having a light modulation member in front of a display board, particularly, relates to a voltage control operation for controlling light transmissivity of the light modulation member according to an illumination intensity of the display board.

BACKGROUND OF THE INVENTION

It is known to use a light modulation member such as an electrochromic display device (ECD) in a vehicle combination meter. The ECD has variable light transmissivity controlled by changing voltage. The ECD is arranged in front of a display board.

According to a light transmissivity control operation of Japanese Patent No. 2848512, for example, when the ignition switch is OFF, a dc voltage with a predetermined amplitude is applied to the ECD to reduce the light transmissivity, to thereby shutter the display board. On the contrary, when the ignition switch is at ON, zero voltage or a dc voltage with an amplitude smaller than the predetermined amplitude is applied to the ECD to increase the light transmissivity, so a driver can see the display board.

Also, it is proposed to form the display board of the combination meter from a metal plate, which is gloss finished or mirror finished. In this case, however, an external light, e.g., sunlight, is likely to reflect on the metal display board and causing the driver to be blind. To restrict the reflection of the external light, it is proposed to control the light transmissivity of the ECD according to an illumination intensity of the display board when the ignition switch is at ON.

For example, when the illumination intensity of the surface of the display board is relatively high, the light transmissivity is reduced by applying dc voltage having small amplitude, to thereby restrict entry of the external light to the display board. When the illumination intensity of the surface of the display board is relatively low, the light transmissivity is increased by applying dc voltage having relatively large amplitude, thereby to maintain a visibility of the display board.

If the dc voltage is continuously applied to the ECD, the ECD is likely to be deteriorated early, and it is difficult to maintain the long life. If the ECD is deteriorated, the color of the ECD is likely to be changed from the periphery of the display area. When a metallic substance in an oxidation color layer, which partly constitutes an EC layer of the ECD, is reduced and precipitated, brown spots occur on the EC layer. This is likely to relate to a time and a value of voltage applied thereon. The peripheral color change is likely to occur near an electrode where an electric field is high.

To increase the life of the ECD, it is proposed to apply a rectangular wave alternating voltage. This method is so-called a duty drive, and a time to apply a voltage in a predetermined direction is reduced. Namely, the voltage is applied alternately in opposite directions. When the voltage is applied in one direction, the ECD changes to a colored condition having low light transmissivity. On the contrary, when the voltage is applied in a reverse direction, the ECD changes to a colorless condition having high light transmissivity. When the duty ratio is more than 50%, the colored conditions continues longer than the colorless condition, so the ECD generally maintains the colored condition. However, since the voltage is applied alternately in opposite directions, power consumption is likely to increase due to rush currents caused on applying the voltage in the respective directions.

SUMMARY OF THE INVENTION

The present invention is made in view of the foregoing matter, and it is an object of the present invention to provide an indicating instrument for a vehicle, capable of improving the life of a light modulation member and reducing power consumption.

According to an aspect of the present invention, an indicating instrument for a vehicle, has a display board, a light modulation member, a light detecting member and a control unit. The light modulation member is disposed in front of the display board to cover a display surface of the display board. The light modulation member includes a pair of electrodes. The light modulation member has light transmissivity that is variable with a voltage applied to the pair of electrodes. The light detecting member is disposed to detect an illumination intensity of the display surface. The control unit applies a dc pulse voltage to the electrodes of the light modulation member, to thereby control light transmissivity of the light modulation member according to the illumination intensity of the display board.

Accordingly, since the voltage is intermittently applied to the light modulation member by the dc pulse voltage, a time for applying the voltage is reduced, as compared to a time when the dc voltage is continuously applied. Therefore, the life of the light modulation member improves. In addition, a power consumption due to rush current is reduced, as compared to the power consumption when an alternating voltage is applied. Thus, the light modulation member is effectively operated.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENTS

Figure 1:
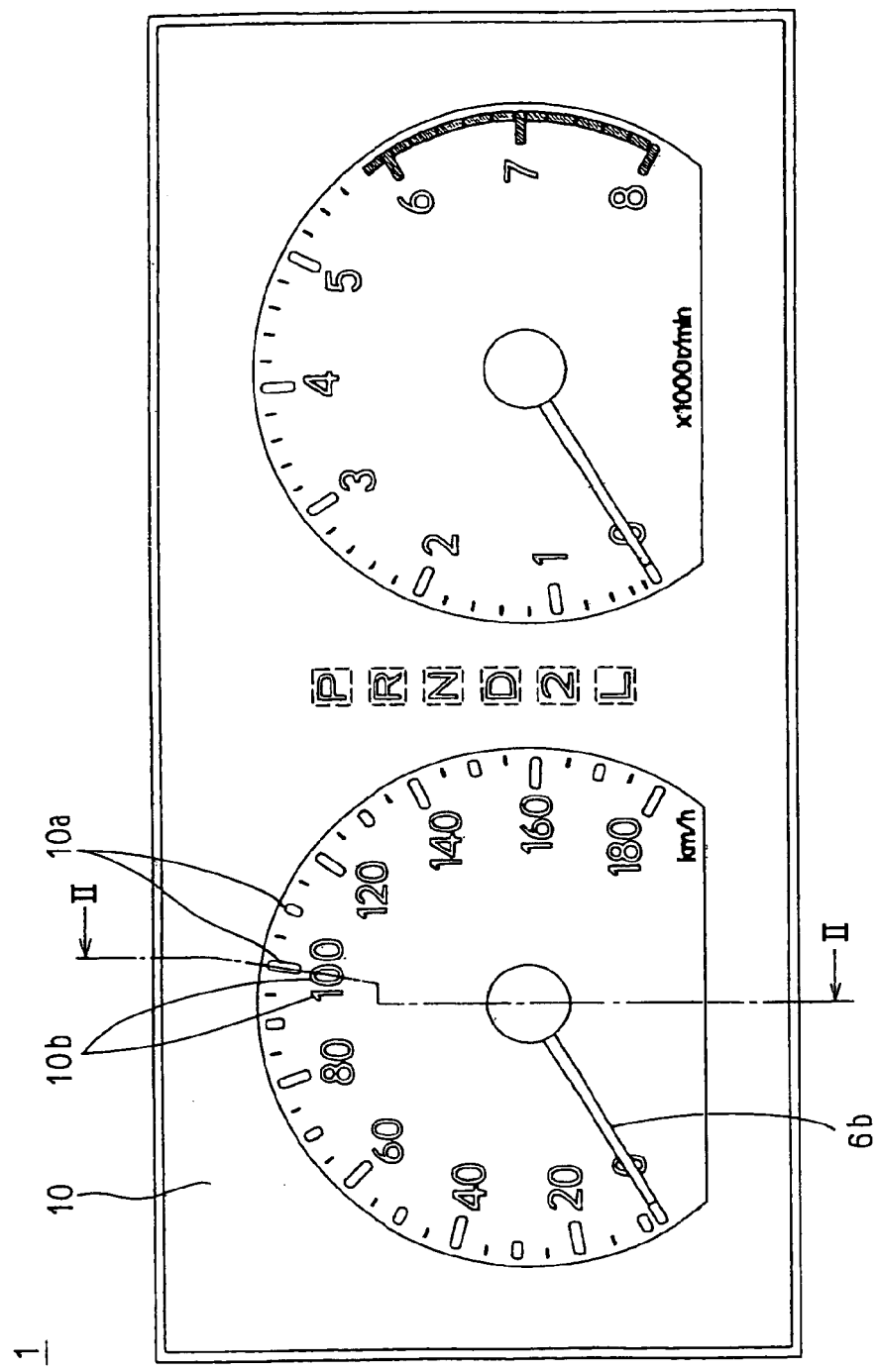
FIG. 1 is a front view of a combination meter according to a first example embodiment of the present invention.
Figure 2:
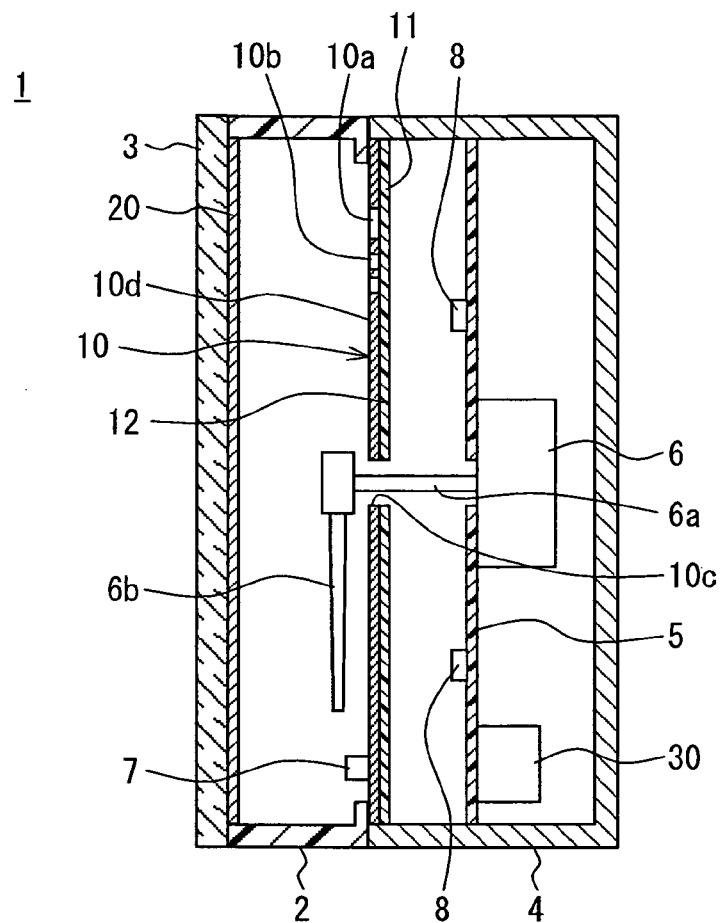
FIG. 2 is a cross-sectional view of the combination meter, taken along line II-II in FIG. 1.

A first example embodiment of the present invention will now be described with reference to FIGS. 1 to 5B. As shown in FIG. 1, an indicating instrument of the present invention is exemplary employed to a combination meter 1 for the vehicle. The combination meter 1 is located at a front position of a passenger compartment where a driver can easily see it. The combination meter 1 has a display board 10 on which various information is displayed. In the embodiment, the left side of FIG. 2 is referred to as a front side of the combination meter 1, which faces the driver, and the right side of FIG. 2 is referred to as a rear side of the combination meter 1.

The display board 10 is made of a thin metallic plate, such as an aluminum sheet. The display board 10 has a plurality of scales 10a and characters 10b. As shown in FIG. 2, the scales 10a and the characters 10b are formed of predetermined shaped holes that are made by pressing or etching. A display surface 10d of the display board 10 is for example polished to have lustrous to thereby provide an enhanced appearance. Further, the display surface 10d is ornamented with a pattern such as hairlines or fish scales. On the display surface 10d, a display surface illumination sensor 7 is fixed to detect the quantity of light incident on the display surface 10d per unit area, i.e., an illumination intensity of light on the display surface 10d.

A light conducting plate 11 is fixed to a rear surface of the display board 10. The light conducting plate 11 conducts light emitted from a pair of light emitting diodes (LED) 8 to the scales 10a and the characters 10b for illuminating the scales 10a and the characters 10b. The light conducting plate 11 is made of a transparent or translucent resin, such as an acrylic resin.

The display board 10 and the light conducting plate 11 are covered by a casing 4 from the rear side. A printed circuit board 5 having an electric circuit of the combination meter 1 is accommodated in the casing 4, on the rear side of the display board 10. A movement 6 is fixed on the printed circuit board 5. The movement 6 rotates a pointer shaft 6a according to an outer signal. The shaft 6a extends through a through hole 10c formed on the display plate 10 and carries a pointer 6b at its end.

The pointer 6b is a self-illuminating pointer and is for example made of an electric discharge tube or a light-conducting member that introduces light from outside. The pair of light emitting diodes 8 is fixed to the front surface of the printed circuit board 5, which is opposed to the display board 10 and the light conducting plate 11, as a light source for illuminating the display board 10.

Further, a controller 30 is fixed on the printed circuit board 5 for controlling a voltage applied to a light modulation film 20. The controller 30 is for example made of a hybrid IC. The controller 30 includes a ROM and a RAM (e.g., 30a, 30b in FIG. 7).

In FIG. 2, the illumination sensor 7 is fixed to the display board 10. Alternatively, the illumination sensor 7 can be fixed to the printed circuit board 5 at a position corresponding to a light transmitting part of the display board 10.

A front surface of the display board 10 is covered with a transparent cover 3 through a ring-shaped hood 2. The cover 3 has a plate shape and is made of a transparent material such as a polycarbonate. The light modulation film 20 is attached to a whole surface of the cover 3, which is opposed to the front surface of the display board 10, as a light modulation member.

Figure 3:
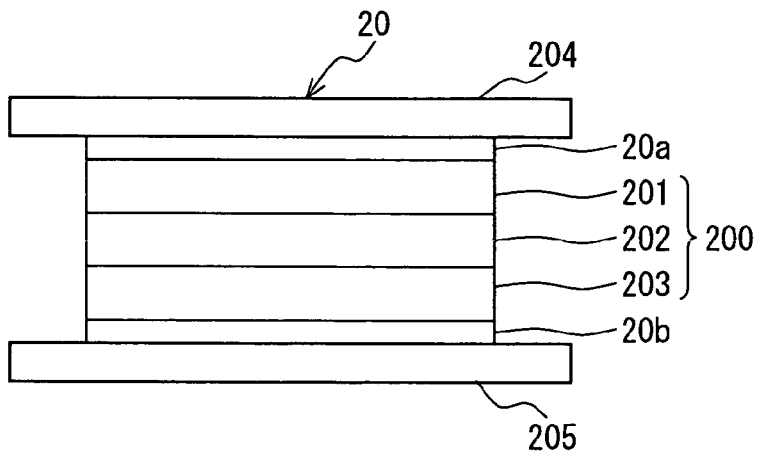
FIG. 3 is a schematic view of a light modulation film of the combination meter, for showing internal layered structures thereof, according to the first example embodiment of the present invention.

The light modulation film 20 is constructed of a thin solid electrochromic display device (ECD). As shown in FIG. 3, the ECD has an EC device 200, a pair of protection glass panels 204, 205, and transparent electrode layers 20a, 20b. The EC device 200 is located between and protected by the pair of glass panels 204, 205. Further, the EC device 200 has a reduction color layer 201 containing $WO_3$, a solid electrolyte layer 202 containing $Ta_2O_3$, and an oxidation color layer 203 containing Ir—Sn(OH)n. The transparent electrode layers 20a, 20b are sandwiched between the glass panels 204, 205 and the EC device 200. The transparent electrode layers 20a, 20b are for example made of indium tin oxide (ITO). The voltage is applied between the transparent electrode layers 20a, 20b.

In the oxidation color layer 203, tin (Sn) is doped to enhance oxidation of iridium (Ir). The oxidation color layer 203 has a thickness of 1800 angstrom ($1800 \times 10^{-10}$ µm), which is 1.5 times of a thickness of a conventional layer.

When the voltage applied to the transparent electrode layers 20a, 20b is 0V, each layer is in a colorless condition and has the highest light transmissivity. In the colorless condition, the light transmissivity of the light modulation film 20 is approximately 70%.

For example, when the voltage is applied in one direction (first direction) between the transparent electrode layers 20a, 20b so that the oxidation color layer 203 is on a positive side and the reduction color layer 201 is on a negative side, $H^+$ ion moves from the solid electrolyte layer 202 to the reduction color layer, and $OH^-$ ion moves from the solid electrolyte layer 202 to the oxidation color layer 203. As s result, the color of the reduction color layer 201 changes to blue by a reduction action. Also, the color of the oxidation color layer 203 changes to gray by an oxidation action. Accordingly, the light modulation film 20 changes to the colored condition having low light transmissivity. That is, the light transmissivity of the light modulation film 20 reduces without changing its color. For example, a voltage having an amplitude of 1.3V is applied, the light modulation film 20 becomes in the colored condition having the light transmissivity of 25%.

In the above colored condition, when the voltage is applied between the transparent electrode layers 20a, 20b so that the reduction color layer 201 is on the positive side and the oxidation color layer 203 is on the negative side, that is, the voltage is applied in a reverse direction (second direction), a reverse reaction occurs in the light modulation film 20. Thus, the light modulation film 20 changes to the colorless condition having the high light transmissivity. Also, when the applied voltage is set to 0V, the light modulation film 20 also changes to the colorless condition. Further, when an electric connection between the electrodes 20a, 20b is opened without applying the voltage, the light modulation film 20 also changes to the colorless condition.

The light modulation film 20 has a reaction delay with respect to the applied voltage. When the electric connection between the electrodes 20a, 20b is opened and it is stopped applying the voltage in the colored condition, the light modulation film 20 maintains the colored condition for a predetermined time period. Namely, the light modulation film 20 has a memory characteristic.

Accordingly, when the voltage with the predetermined amplitude is applied in the first direction, the light transmissivity of the light modulation film 20 decreases at a predetermined rate of change, and reaches a predetermined level corresponding to the value of the applied voltage. Therefore, the light modulation film 20 changes to the colored condition. On the contrary, when the electrodes 20a, 20b are opened and the applied voltage is stopped in a condition that the voltage is applied, the light modulation film 20 changes to the colorless condition. At this time, the light transmissivity increases at a rate of change lower than the predetermined rate of change that is when the light modulation film 20 changes to the colored condition.

Figure 4:
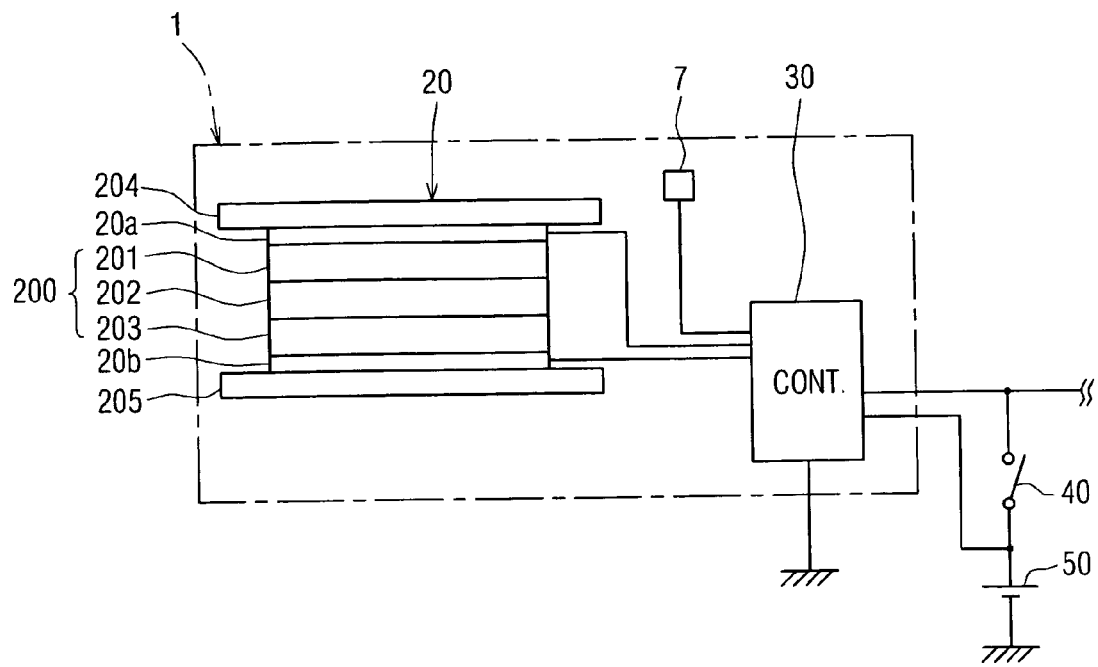
FIG. 4 is a circuit diagram of a controller of the combination meter for controlling light transmissivity of the light modulation film according to the first example embodiment of the present invention.

As shown in FIG. 4, the controller 30 is normally supplied with electric power from a battery 50. The controller 30 is electrically connected to the illumination sensor 7, an ignition switch 40, and the transparent electrode layers 20a, 20b of the light modulation film 20. The controller 30 controls the voltage to be applied to the transparent electrode layers 20a, 20b according to detection signals of the illumination sensor 7 and the ignition switch 40.

Next, a voltage control operation of the controller 30 and a visibility of the display board 10 will be described. When the ignition switch 40 is at ON, i.e., a vehicle is in an operative condition, the controller 30 detects the condition of the ignition switch 40 and controls the voltage to be applied to the light modulation film 20 according to the output signal of the illumination sensor 7, to thereby control the light transmissivity of the light modulation film 20.

When the illumination intensity detected by the illumination sensor 7 is higher than a predetermined value, it is considered that the driver is likely to be blind with an external light reflected on the display surface 10d. Therefore, the dc pulse voltage is applied in the first direction between the transparent electrode layers 20a, 20b, so the light modulation film 20 transfers from the colorless condition to the colored condition having the low light transmissivity.

As shown in FIG. 5, the dc pulse voltage has an amplitude of approximately 1.3 V, for example. Also, a leading pulse has a pulse width Ta of approximately 60 seconds. A succeeding pulse has a pulse width Tw of approximately 20 seconds. Further, the dc pulse voltage has a pulse interval Ti of approximately 40 seconds. Here, during 40 seconds of the pulse interval Ti, the transparent electrode layers 20a, 20b are in the open condition.

Figure 5A:
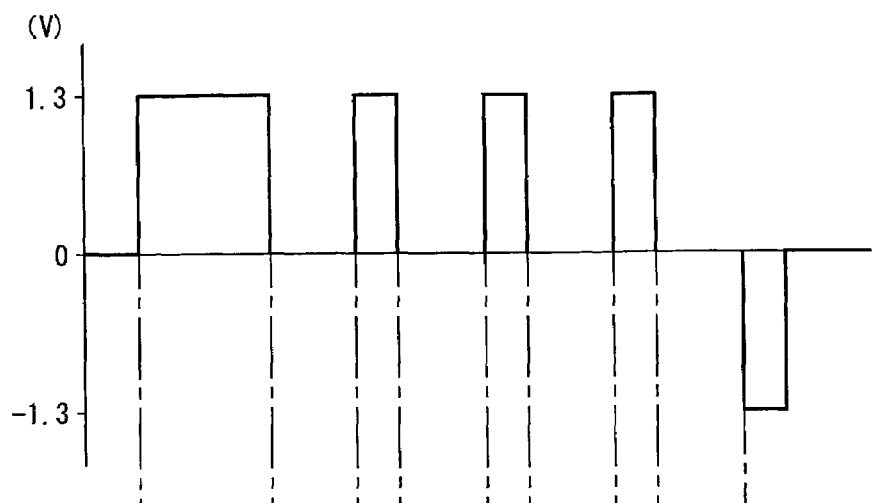
FIG. 5A is a wave form chart of a dc pulse voltage applied to the light modulation film according to the first embodiment of the present invention.
Figure 5B:
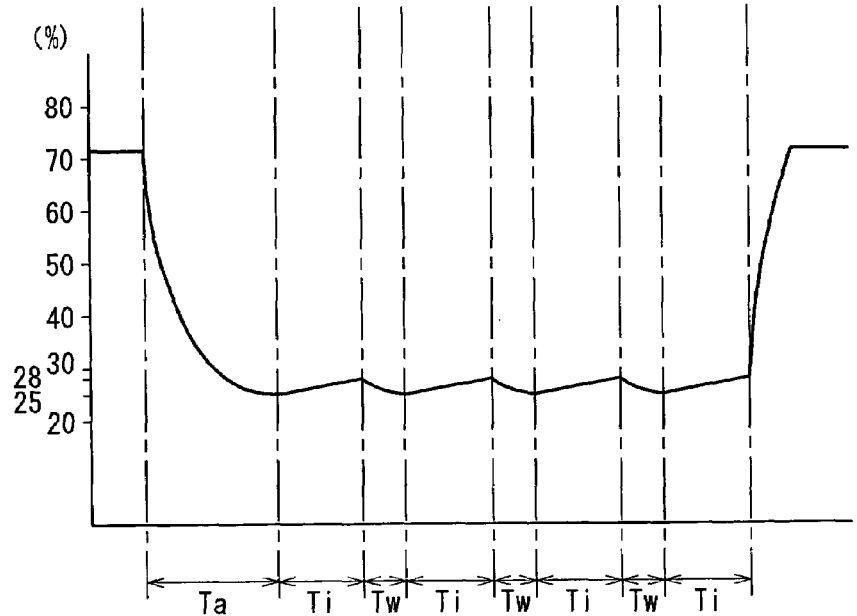
FIG. 5B is a graph showing the change of light transmissivity of the light modulation film relative to the dc pulse voltage shown in FIG. 5A.

As shown in FIGS. 5A and 5B, the light modulation film 20 changes to the colored condition having approximately 30% light transmissivity, approximately 30 seconds after starting applying the leading pulse. The light transmissivity decreases to approximately 25% at the end of the leading pulse. During the pulse interval Ti of 40 seconds and before the next pulse, the light transmissivity gradually increases and the light modulation film 20 changes towards the colorless condition. As described above, the light modulation film 20 has the memory characteristic, and the rate of change from the colored condition to the colorless condition is smaller than the rate of change from the colorless condition to the colored condition. Therefore, the light transmissivity increases only approximately 3% in 40 seconds.

Thereafter, when the next pulse is applied, the light transmissivity decreases to approximately 25% again. Accordingly, the light transmissivity fluctuates in a range approximately between 25% and 28%.

When the fluctuation of the light transmissivity is approximately within 3%, a human will not visually sense the fluctuation. Therefore, the driver feels a constant transmissivity.

In a dc pulse voltage applying method as described above, a total time of applying the voltage to the light modulation film 20 is approximately one-third of a voltage applying time of a voltage continuously applying method in which the dc voltage is continuously applied.

When the illumination intensity detected by the illumination sensor 7 is lower than the predetermined value, it is necessary to maintain the visibility of the display surface 10d. Thus, the voltage is applied in the reverse direction between the transparent electrode layers 20a, 20b so that the light modulation film 20 changes from the colored condition to the colorless condition. Accordingly, the light transmissivity rapidly increases to 70%, as shown in FIG. 5B.

Accordingly, the light modulation film 20 is controlled to the colored condition having the low light transmissivity or the colorless condition having the high light transmissivity according to the illumination intensity of the display board 10. Therefore, when the vehicle is in a relatively light ambience, the external light is restricted from reflecting on the display surface 10d. It is less likely that the driver will be blind with the reflected light. Further, when the vehicle is in a relatively dark ambience, the visibility of the display surface 10d is maintained. The light modulation film 20 can be controlled to have different light transmissivity by changing the amplitude of the dc pulse voltage.

Figure 6A:
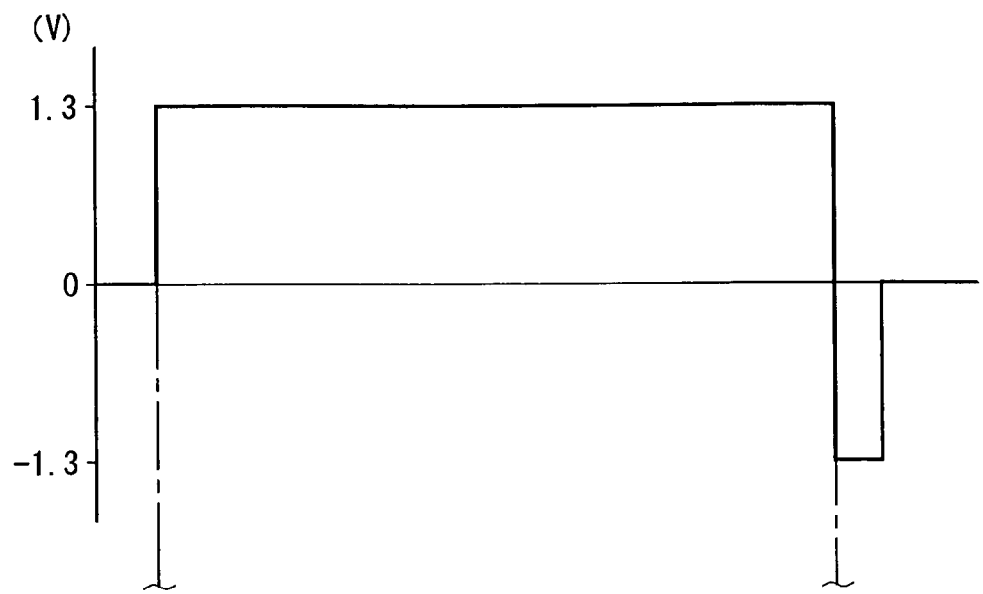
FIG. 6A is a wave form chart of a dc voltage continuously applied to the light modulation film as an comparison example to the embodiment shown in FIG. 5A.
Figure 6B:
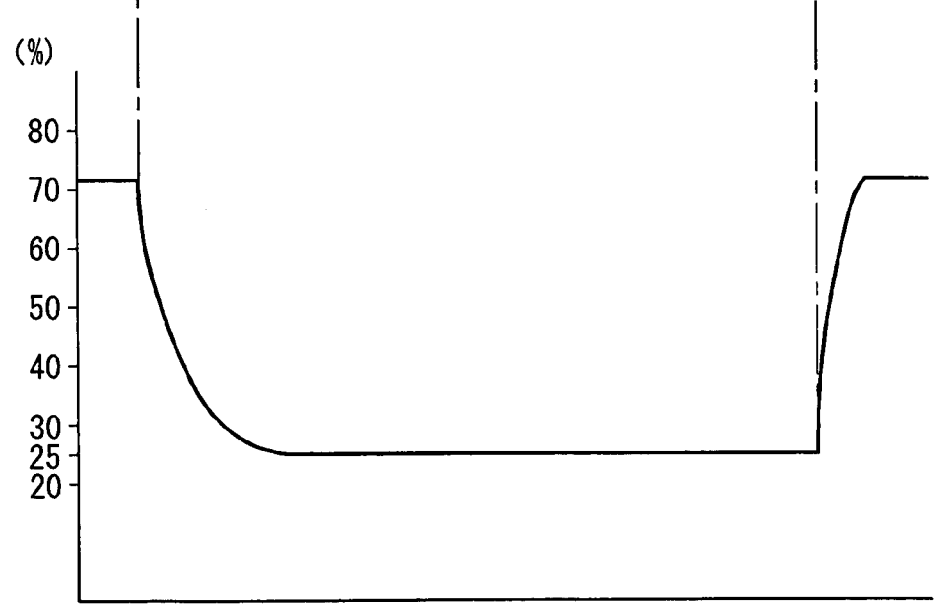
FIG. 6B is a graph showing the change of light transmissivity of the light modulation film relative to the continuously applied dc voltage shown in FIG. 6A.

The life of the light modulation film 20 when the dc pulse voltage is applied is examined. FIGS. 6A and 6B show a comparison example in which the dc voltage is continuously applied to the light modulation film 20. FIGS. 5A and 6A show one cycle in which a time for applying the voltage in one direction and a time for applying the voltage in the reverse direction are five minutes in total. The voltage is successively applied to the light modulation film 20 in the above cycle. The life of the light modulation film 20 in the dc pulse voltage applying method shown in FIG. 5A is compared to the life in the dc voltage continuously applying method shown in FIG. 6A. Here, the life is determined as a time period from the starting of the voltage applying operation to when peripheral color change occurs in the EC element 200.

As a result, in the dc voltage continuously applying method, the peripheral color change occurs at approximately 430 hours after the voltage applying operation started. On the other hand, in the dc pulse voltage applying method, the peripheral color change does not occur even at 1800 hours after the operation started. Accordingly, in the dc pulse voltage applying method of the embodiment, the light modulation film 20 improves the life of four times of that in the dc voltage continuously applying method.

In the embodiment, the voltage is intermittently applied to the light modulation film 20 by the dc pulse voltage. Since the time of applying the voltage reduces, the life of the light modulation film 20 improves. Further, the power consumption due to rush current reduces in the dc pulse voltage applying method, as compared to a case applying an alternating voltage. Accordingly, the light modulation film 20 is effectively operated.

The light transmissivity of the light modulation film 20 is determined with the amplitude of the dc pulse voltage. The light transmissivity can be changed to different levels by changing the amplitude. Therefore, the light transmissivity is easily controlled.

The pulse interval and the pulse width of the dc pulse voltage are determined so that the light transmissivity is maintained within the predetermined range for effectively using the visual characteristic of the driver. Therefore, the time of applying the voltage to the light modulation film 20 is reduced. Accordingly, the life of the light modulation film 20 further improves.

Since the light modulation film 20 has the memory characteristic, the voltage applying time for maintaining the light transmissivity in the predetermined range is shorter than the time without applying the voltage. That is, the pulse width Tw is shorter than the pulse interval Ti. With this, the voltage applying time is reduced. Therefore, the life of the light modulation film 20 further improves, and the power consumption reduces.

In addition, the oxidation color layer 203 has the thickness of one-and-a-half times of that of the conventional film. Therefore, the life of the light modulation film 20 further improves.

The solid film type ECD is used as the light modulation film 20. Accordingly, the light transmissivity is easily controlled by controlling the voltage applied across the electrode films 20a, 20b.

Figure 7:
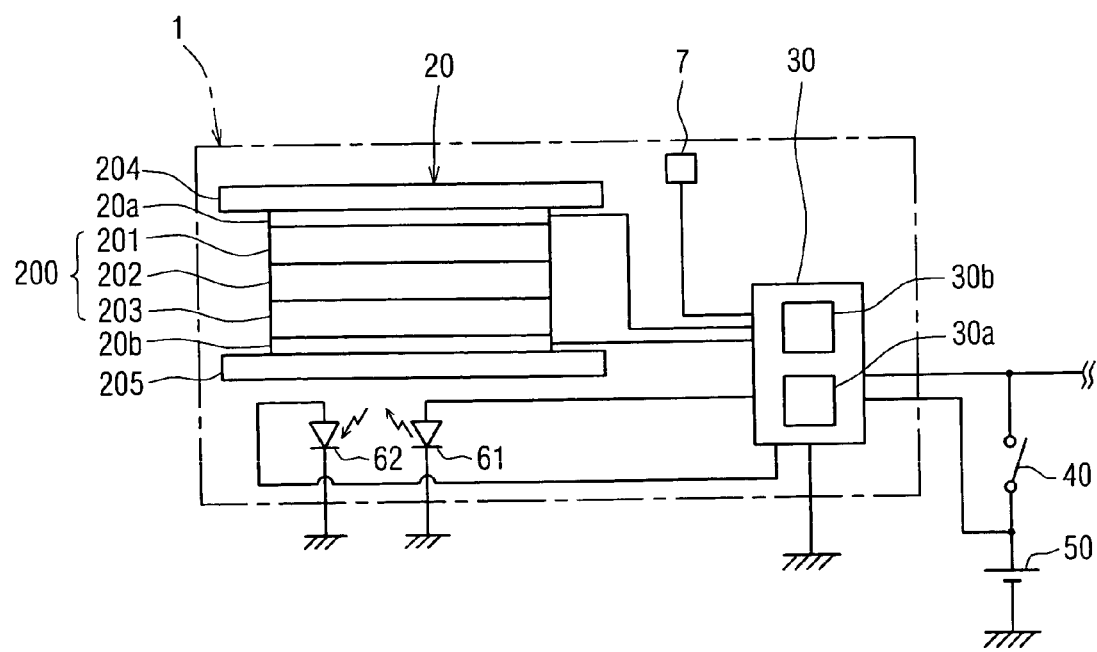
FIG. 7 is a circuit diagram of the controller of the combination meter for controlling the light transmissivity of the light modulation film according to a second example embodiment of the present invention.

A second embodiment of the present invention will be now described with reference to FIG. 7. Hereafter, like components are denoted by like reference characters and a description thereof is not repeated.

In the second embodiment, a light emitting element 61 and a light receiving element 62 are added as the light transmissivity detecting means. The light emitting element 61 includes a light emitting diode (LED). The LED is arranged to project light toward the protection glass panel 204 of the light modulation film 20. The light receiving element 62 includes a photo diode (PD). The PD is arranged to receive the light that is projected from the LED and reflected on the protection glass panel 204. The light emitting element 61 and the light receiving element 62 are connected to the controller 30.

The controller 30 supplies the light emitting element 61 with a drive current, to thereby drive the light emitting element 61. Also, the controller 30 detects a photoelectric current passing through the light receiving element 62, and controls the voltage to be applied to the light modulation film 20 based on the detected photoelectric current.

For example, when the light transmissivity of the light modulation film 20 is low, a reflectance of the light modulation film 20 is increased. Thus, the photoelectric current of the light receiving element 62 increases. On the contrary, when the light transmissivity of the light modulation film 20 is high, the reflectance is decreased. Thus, the photoelectric current of the light receiving element 62 decreases. The controller 30 controls the voltage to the light modulation film 20 based on this inverse proportional relationship.

For example, when the illumination intensity detected by the illumination sensor 7 is higher than the predetermined level, in a condition that the ignition switch is at ON, the controller 30 applies the dc voltage with the amplitude of 1.3 V in one direction between the transparent electrode layers 20a, 20b. So, the light modulation film 20 changes from the colorless condition to the colored condition.

The controller 30 drives the light emitting element 61 and detects the photoelectric current of the light receiving element 62 while applying the dc voltage. When the detected photoelectric current becomes a value corresponding to the light transmissivity of 25%, the controller 30 stops applying the dc voltage to the light modulation film 20. Thus, the light transmissivity gradually increases from 25%. When the photoelectric current becomes a value corresponding to the light transmissivity of 28%, the controller 30 starts to apply the dc voltage to the light modulation film 20 again. Likewise, when the photoelectric current becomes the value corresponding to the light transmissivity of 25%, the controller 30 again stops applying the dc voltage.

Accordingly, the controller 30 determines the timings of applying the dc voltage and stopping the dc voltage according to the photoelectric current of the light receiving element 62 so that the light transmissivity of the light modulation film 20 is maintained in the range approximately between 25% and 28%. Namely, the pulse width and the pulse interval of the dc pulse voltage are controlled according to the photoelectric current of the light receiving element 62.

To set the light transmissivity to a level other than 30% in the colored condition, the dc pulse voltage having an amplitude corresponding to a desired light transmissivity can be applied.

Since the pulse width and pulse interval of the dc pulse voltage are determined based on the photoelectric current of the light receiving element 62, the light transmissivity is controlled to an optimal level, irrespective to individual differences of the light modulation film 20.

In the above, the light receiving element 62 is arranged to receive the light reflected on the protection glass panel 204. Instead, the light radiating element 61 and the light receiving element 62 can be arranged to interpose the light modulation film 20 between them so that the light receiving element 62 receives the light emitted from the light radiating element 61 and passed through the light modulation film 20. In this case, the photoelectric current of the light receiving element 62 and the light modulation film 20 have a proportional relationship. Therefore, the dc pulse voltage is applied based on the proportional relationship.

The example embodiments of the present invention are described above. However, the present invention is not limited to the above example embodiments, but may be implemented in other ways without departing from the spirit of the invention.

In the first embodiment, the light transmissivity of the light modulation film 20 is automatically controlled according to the illumination intensity of the display surface 10d. Alternatively, the light transmissivity of the light modulation film 20 can be manually controlled. For example, a switching means for switching between an automatic mode and a manual mode and an adjusting means for adjusting the light transmissivity can be added. The automatic mode or the manual mode can be selected by the user. When the manual mode is selected, the light transmissivity can be set to a desired level by operating with the adjusting means.

In the first example embodiment, the pulse interval Ti and the pulse width Tw of the succeeding pulse are not limited to 40 seconds and 20 seconds, respectively. The pulse interval Ti and the pulse width Tw of the succeeding pulse can be changed as long as the fluctuation of the light transmissivity is maintained within 3%.

In the above embodiments, the light transmissivity is controlled to 30% or 70% so that the shutter of the light modulation film 20 is open or closed. Instead, the light transmissivity can be controlled in an analog fashion according to the illumination intensity. Since the light transmissivity of the light modulation film 20 is determined by the amplitude of the dc pulse voltage, the light transmissivity is optimally set by adjusting the amplitude of the dc pulse voltage.

In the embodiment shown in FIG. 5A, the dc pulse voltage has a rectangular pulse wave. However, the dc pulse voltage is not limited to the rectangular pulse voltage. The dc voltage may has a different pulse wave such as a triangular pulse.

Further, information displayed on the display surface 10d and arrangement of the information are not limited to the embodiment illustrated in FIG. 1. The display board 10 can display other information, with different arrangement.

Additional advantages and modifications will readily occur o those skilled in the art. The invention in its broader terms is therefore not limited to the specific details, representative apparatus, and illustrative examples shown and described.

What is claimed is:

1. An indicating instrument for a vehicle, comprising:
a display board having a display surface;
a light modulation member located in front of the display surface, the light modulation member including a pair of electrodes and having light transmissivity variable with a voltage applied between the pair of electrodes;
a light detecting member disposed to detect an illumination intensity of the display board; and
a control unit applying a dc pulse voltage between the pair of electrodes for controlling the light transmissivity according to the illumination intensity of the display board;
wherein, while the dc pulse voltage is applied in one direction, the control unit controls the dc pulse voltage such that fluctuation of the light transmissivity of the light modulation member when the voltage is on and when the voltage is off is maintained in a predetermined range.

2. The indicating instrument according to claim 1, wherein the control unit determines an amplitude of the dc pulse voltage so that the light transmissivity is controlled to a level corresponding to the illumination intensity.

3. The indicating instrument according to claim 1, wherein
the light modulation member is variable from a first condition having a first light transmissivity to a second condition having a second light transmissivity that is lower than the first light transmissivity when the dc pulse voltage is applied in one direction.

4. The indicating instrument according to claim 3, wherein
the light modulation member has a reaction delay with respect to the dc pulse voltage and a characteristic of maintaining the second condition for a predetermined time period when the electrodes are opened in the second condition, and
the dc pulse voltage has a pulse interval larger than a pulse width.

5. The indicating instrument according to claim 1, further comprising:
a light transmissivity detecting member disposed to detect the light transmissivity of the light modulation member, wherein the control unit determines at least one of a pulse width, a pulse interval and an amplitude of the dc pulse voltage according to the light transmissivity detected by the light transmissivity detecting member.

6. The indicating instrument according to claim 1, wherein the light modulation member comprises a solid thin electrochromic display device.

7. The indicating instrument according to claim 1, wherein the display board comprises a metal plate having a lustrous surface.

8. The indicating instrument according to claim 1, wherein the predetermined range of the fluctuation is at most approximately 3%.

9. The indicating instrument according to claim 1, wherein a pulse interval of the dc pulse voltage is 40 seconds and a pulse width of the dc pulse voltage is 20 seconds.

10. The indicating instrument according to claim 3, wherein the light modulation member is in the first condition when the dc pulse voltage is not applied and is in the second condition while the dc pulse voltage is applied.

11. The indicating instrument according to claim 1, wherein the light modulation member has a reaction delay with respect to the dc pulse voltage and has a characteristic of maintaining light transmissitivity for a predetermined time period when a pulse is off while the dc pulse voltage is applied in the one direction, and the dc pulse voltage has a pulse interval larger than a pulse width.

12. The indicating instrument according to claim 1, wherein the predetermined range of the fluctuation is incapable of being visually sensed by a human.

13. The indicating instrument according to claim 1, wherein the predetermined range of the fluctuation is such that the light transmissivity of the light modulation member at any point in the predetermined range is less than or equal to 28%.

14. The indicating instrument according to claim 1, wherein the light modulation member has a reaction delay with respect to the dc pulse voltage and has a characteristic of maintaining light transmissitivity for a predetermined time period when a pulse is turned off while the dc pulse voltage is applied in the one direction.

15. An indicating instrument for a vehicle, comprising:
a display board having a display surface;
a light modulation member located in front of the display surface, the light modulation member including a pair of electrodes and having light transmissivity variable with a voltage applied between the pair of electrodes;
a light detecting member disposed to detect an illumination intensity of the display board; and
a control unit applying a dc pulse voltage between the pair of electrodes for controlling the light transmissivity according to the illumination intensity of the display board;
wherein the light modulation member is variable from a first condition having a first light transmissivity to a second condition having a second light transmissivity that is lower than the first light transmissivity when the dc pulse voltage is applied in one direction;
the light modulation member has a reaction delay with respect to the dc pulse voltage and a characteristic of maintaining the second condition for a predetermined time period when the electrodes are opened in the second condition; and
the dc pulse voltage has a pulse interval larger than a pulse width.

16. An indicating instrument for a vehicle, comprising:
a display board having a display surface;
a light modulation member located in front of the display surface, the light modulation member including a pair of electrodes and having light transmissivity variable with a voltage applied between the pair of electrodes;
a light detecting member disposed to detect an illumination intensity of the display board; and a control unit applying a dc pulse voltage between the pair of electrodes for controlling the light transmissivity according to the illumination intensity of the display board;

wherein the light modulation member has a reaction delay with respect to the dc pulse voltage applied between the pair of electrodes such that a rate of change of the light modulation member from a colored condition to a colorless condition is smaller than a rate of change from the colorless condition to the colored condition.

* * * * *